(12) United States Patent
Meierhoefer et al.

(10) Patent No.: US 7,135,052 B2
(45) Date of Patent: Nov. 14, 2006

(54) CASSETTE FILTER

(75) Inventors: Michael Meierhoefer, Hemsbach (DE); Renate Tapper, Bensheim (DE); Thomas Caesar, Leimen (DE); Heiko Knust, Laudenbach (DE); Thorsten Schmitt, Weinheim (DE); Norbert Kuck, Hemsbach (DE); Rainer Kaffenberger, Reichelsheim (DE)

(73) Assignee: Carl Freudenberg KG, Weinheim (DE)

(*) Notice: Subject to any disclaimer, the term of this patent is extended or adjusted under 35 U.S.C. 154(b) by 167 days.

(21) Appl. No.: 10/485,762

(22) PCT Filed: Jun. 14, 2002

(86) PCT No.: PCT/EP02/06535

§ 371 (c)(1),
(2), (4) Date: Feb. 3, 2004

(87) PCT Pub. No.: WO03/013695

PCT Pub. Date: Feb. 20, 2003

(65) Prior Publication Data
US 2004/0172926 A1   Sep. 9, 2004

(30) Foreign Application Priority Data
Aug. 7, 2001   (DE) ................. 101 37 926

(51) Int. Cl.
*B01D 46/10*   (2006.01)
*B01D 46/52*   (2006.01)

(52) U.S. Cl. .............. 55/495; 55/497; 55/499; 55/500; 55/501; 55/509; 55/511; 55/521; 55/DIG. 31; 210/493.1; 210/493.5

(58) Field of Classification Search .......... 55/490, 55/495, 496, 497, 499, 500, 501, 509, 511, 55/521, DIG. 31; 210/493.1, 493.5
See application file for complete search history.

(56) References Cited

U.S. PATENT DOCUMENTS

| 2,709,489 A |   | 5/1955 | Keebler ................... 160/381 |
| 2,909,237 A |   | 10/1959 | O'Dell ..................... 183/44 |
| 4,885,015 A |   | 12/1989 | Goulet et al. .............. 55/497 |
| 5,145,500 A | * | 9/1992 | Nolen, Jr. ............ 55/DIG. 31 |
| 5,230,799 A |   | 7/1993 | Willard et al. ............ 210/455 |
| 5,840,094 A | * | 11/1998 | Osendorf et al. ............ 65/27 |
| 5,944,860 A | * | 8/1999 | Mack et al. ............... 55/497 |
| 6,059,966 A |   | 5/2000 | Brandhofer et al. ....... 210/232 |
| 6,464,745 B1 | * | 10/2002 | Rivera et al. .............. 55/497 |
| 6,599,343 B1 | * | 7/2003 | Fredrick et al. ............ 55/497 |
| 6,846,342 B1 | * | 1/2005 | Mertz et al. ............... 55/521 |

FOREIGN PATENT DOCUMENTS

| DE | 1776236 | 10/1974 |
| DE | 197 11 280 | 9/1998 |
| FR | 2020770 | 7/1970 |
| JP | 3-217210 | * 9/1991 |

(Continued)

*Primary Examiner*—Jason M. Greene
(74) *Attorney, Agent, or Firm*—Davidson, Davidson & Kappel, LLC

(57) ABSTRACT

A cartridge filter includes a folded package including filter material and a frame holding the folded package. The frame includes a plurality of profiled strips having identical profiles, and each having two ends. The frame also includes a plurality of corner joints, each disposed at an end of a respective profiled strip. Each corner joint includes an end cap for engaging pair wise with an end cap of an adjacent one of the plurality of corner pieces.

12 Claims, 4 Drawing Sheets

FOREIGN PATENT DOCUMENTS

| | | |
|---|---|---|
| JP | 03217210 | 9/1991 |
| JP | 6-7820 | 2/1994 |
| JP | 6-60415 | 8/1994 |
| JP | 2000-254425 * | 9/2000 |
| JP | 200054425 | 9/2000 |

* cited by examiner

CASSETTE FILTER

BACKGROUND

Plants which have pure air spaces make high demands on the purity of the interior air. Air cleaned of dust and microorganisms is necessary in the plants in order to maintain the desired air purity. In addition to filter pads and pocket filters, cartridge filters are a common component in air filters. Cartridge filters have a folded package which is aligned perpendicularly to the flow direction and an outer frame. The folded package and the frame are sealed against one another using a sealing material. The folded packages are formed using fanfolded filter paper. In air filters for suspended matter, synthetic materials which can be processed in liquid form are exclusively used as sealing material. A nonwoven filter may also be placed into fine filters as sealing material.

The outer frame lends the filter the necessary mechanical stability, protects the filter package from damage, and allows for tightly fitting the filter element into a receptacle. Wood, sheet metal, or extruded aluminum sections are used as frame material. In framing of cartridge filters using a seal made of synthetic material processed in liquid form, the four frame parts are simultaneously joined perpendicularly to one another and bonded with the folded package. The advantage of this technique is in the fact that no additional casting molds or a specific configuration of the frame parts are necessary. However, the disadvantage is that the synthetic material used for the seal is not completely liquid so that the folded package occasionally does not penetrate the synthetic material at all points, thus creating leaks.

A different possibility for manufacturing the cartridge filter includes pouring a liquid casting compound into a prepared casting mold which represents one side of the frame and subsequently setting the folded package into the liquid. After curing of the casting compound, the step is repeated for the other sides of the folded package. Using this technique, the folded package always penetrates the liquid synthetic material completely, so that leaks are prevented. Since a liquid synthetic material is cast, the frame part itself must be formed as a casting mold, or additional auxiliary devices are necessary to prevent the sealing means from running. During joining, for example, additional bars are attached to the frame part as casting edges which prevent the casting compound from running. After curing of the casting compound, these auxiliary devices are again removed. Since the marketplace demands cartridge filters in almost any dimension, separate equipment is required for the production of each frame. By using wood frames or even deep-drawn or cast frame parts, the variety of models can only be satisfied very expensively since each dimension requires a separate deep-draw tool, for example.

SUMMARY OF THE INVENTION

An object of the present invention is to improve the manufacture of cartridge filters, their framing in particular, and to create an alternative for producing frames having different dimensions in a simple manner and which may then be assembled together with the folded package to form a cartridge filter.

In a cartridge filter, a filter for fine or suspended matter or the like in particular, the present invention provides a frame including profiled strips of identical design and of corner joints retaining the profiled strips at their ends, the corner joints having end caps which may be joined in pairs one on top of another. Such a frame design makes it possible to form all four frame parts as a trough, so that the folded package may be fully sealed all around using a low-viscosity liquid synthetic material. Other variants of the seal, which may be used with the same frame design, are also possible.

It is possible to manufacture the profiled strips individually in predefined sizes. The preferred way of manufacturing, however, calls for the profiled strips to be made of an endless extruded section cut to length. The extruded section may be extruded plastic or also extruded aluminum. Profiled strips of a specified width, but of any length, may be manufactured in this way using one single set of tools.

It is advantageous to give the profiled strips a U-shaped design, viewed in cross section, and to bend the edges of the profiled strips inward, thereby supporting the connection with the corner joints, which will be explained in greater detail in connection with the drawing. At least one guide strip aligned along the profiled strips and preferably having a T shape in cross section is attached to the bottoms of the profiled strips and connects to the groove base with the lower end of the T. These T-shaped elevations support the plug connection between the profiled strips and the corner joints. In addition, after curing of the casting compound, the T-shaped elevations intensify the adhesion to the component, thus increasing the adhesive strength between the casting part and the frame part.

According to the present invention, for each frame there are two identical corner joints situated on the sides of the frame opposing each other, the corner joints being insertable into the profiled strips. Each corner joint has a U-shaped step which may be inserted in the front of the particular profiled strip to form a positive fit. In addition, the U-shaped step has a longitudinal slot which surrounds the guide strip. The corner joints additionally have end caps which can be joined in pairs one on top of another.

For manufacturing the filter frame, two frame parts are initially formed, the top side and the bottom side, for example, two equally long profiled strips including two identical corner joints at their ends by inserting same into the profiled strip. In addition, the two other frame parts, the right side and the left side of the frame, are provided by two equally long profiled strips and corner joints inserted at their ends, these corner joints having end caps which may be slipped over the corner joints of the first frame parts. Thus, the top side and the bottom side of the frame are initially cast with the folded package and the right and left sides are subsequently cast and slipped onto the prefabricated folded package.

The lateral outer walls of the outer end caps and the outer walls of the associated profiled strips are aligned flush to one another, so that a frame is created which has flat outer walls.

No locking devices are needed for the plug connection between the corner joints and the profiled strips, since the parts may be fixedly connected to one another by clamping, so that they do not fall apart during the casting and joining steps. As soon as the casting compound is cured, it also glues the individual parts of the frame sides.

DETAILED DESCRIPTION

The design of cartridge filters is known per se, so that only the design of the cartridge frame according to the present invention is explained on the basis of the following figures.

Figure 1:
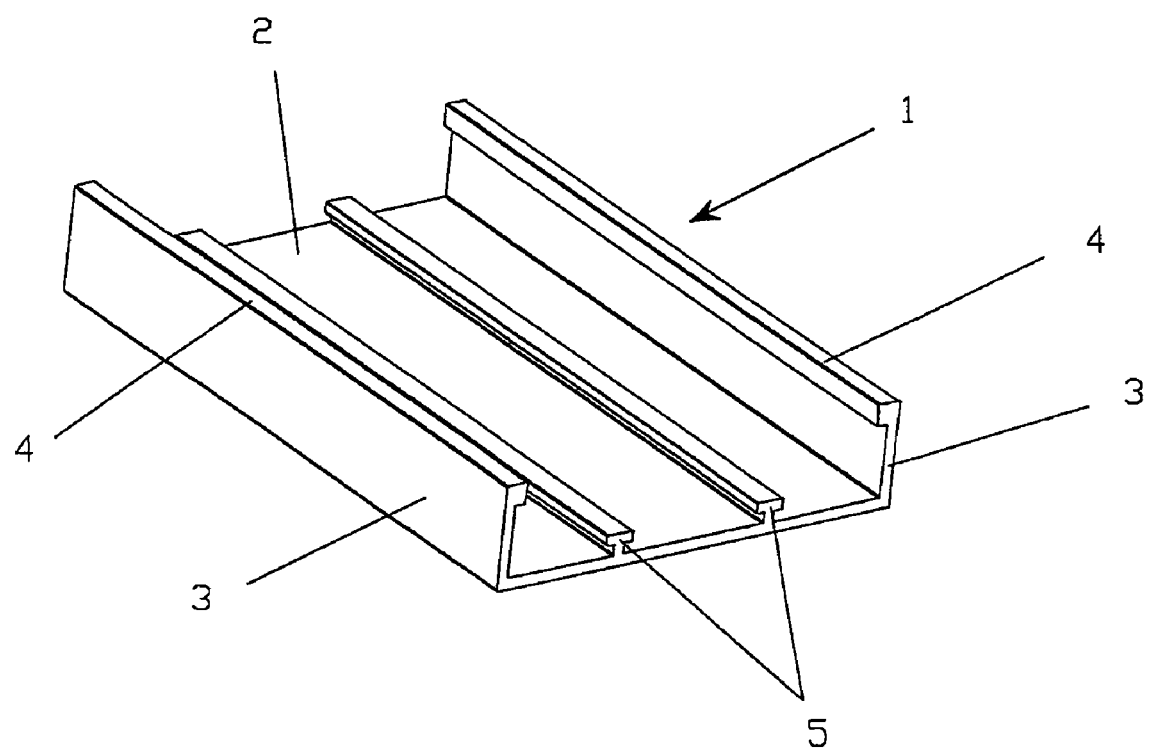
FIG. 1 shows a profiled strip in an oblique view from the top.

FIG. 1 shows profiled strip 1 in a perspective side view from the top. Profiled strip 1 is a piece of an endless extruded section cut to length. It has a U-shaped design, viewed in cross section, including side walls 3 protruding upward from bottom 2. Edges 4 of sidewalls 3 are bent inward. Guide strips 5, which have a T shape in cross section, are attached in longitudinal direction to bottom 2 of profiled strips 1. The lower end of the T is connected to bottom 2.

Figure 2:
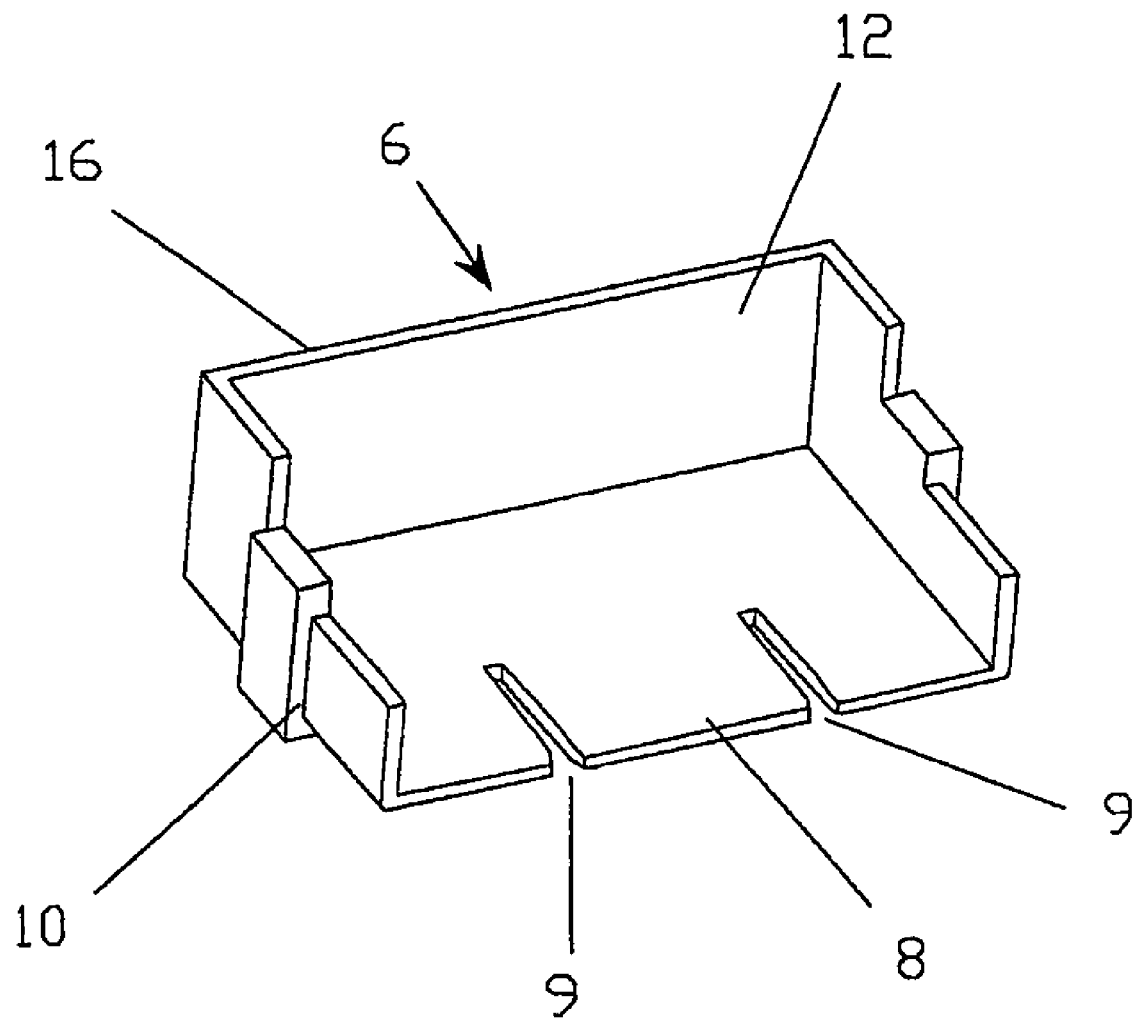
FIG. 2 shows an inner corner joint in an oblique view.
Figure 3:
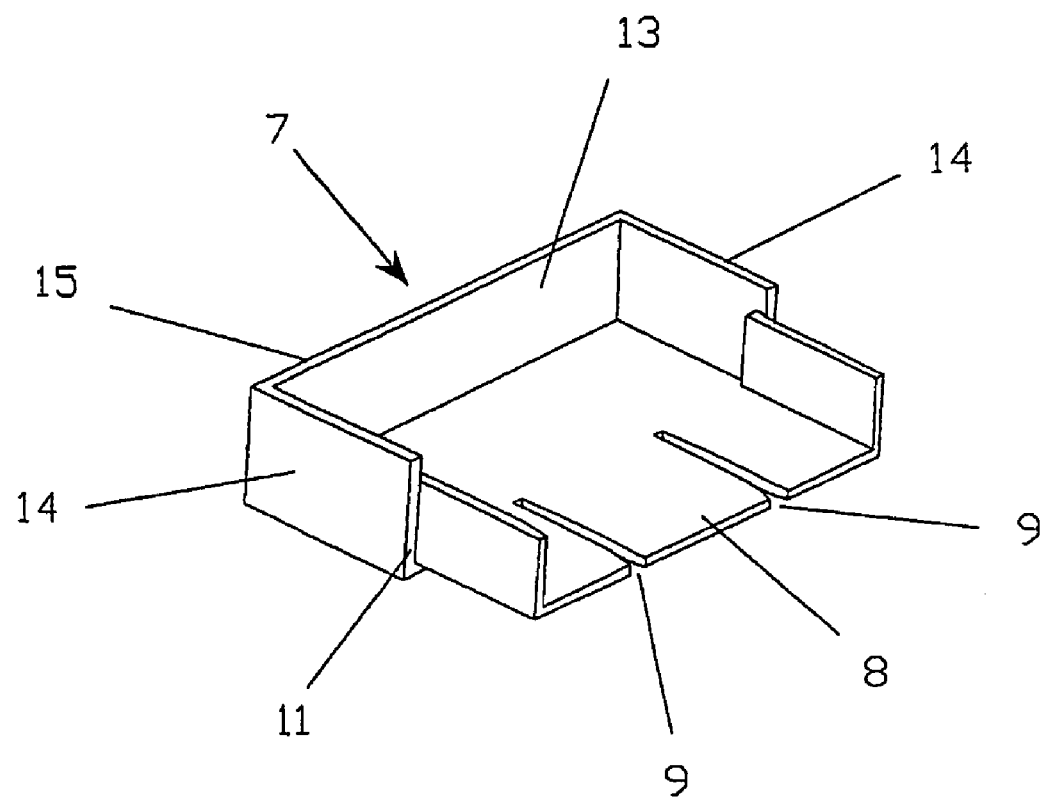
FIG. 3 shows an outer corner joint, also in an oblique view.

FIGS. 2 and 3 each show a corner joint 6 and 7, corner joint 6 in FIG. 2 representing the inner corner joint, and corner joint 7 in FIG. 3 representing the outer corner joint. Corner joints 6 and 7 are manufactured in the form of cast parts, plastic injection molded parts, for example. Each corner joint 6, 7 has a U-shaped step 8 which may be inserted in the front of profiled strip 1, forming a positive fit. In addition, step 8 has two longitudinal slots 9 which surround guide strips 5. The designs of the profiled strips including guide strips 5, sidewalls 3, and edges 4 and the corner joints 6 and 7 are coordinated in such a way that by inserting corner joints 6 and 7 into profiled strip 1 a positive, secure connection between the same is established. The depth of slots 9 determines the depth of the insertion. In addition, corner joints 6 and 7 are laterally provided with stop faces 10 and 11 which contact sidewalls 3 of profiled strips 1. End cap 12 of corner joint 6, referred to as the inner corner joint, has dimensions such that end cap 13 of outer corner joint 7 may be slipped over end cap 12. For this purpose, end cap 12 has a slightly smaller design. The dimensions of lateral outer walls 14 of outer end caps 13 are selected in such a way that they are aligned flush with outer walls 3 of associated profiled strips 1. In a completely assembled frame, face wall 15 of outer end cap 13 completely covers face wall 16 of inner end cap 12.

Figure 4:
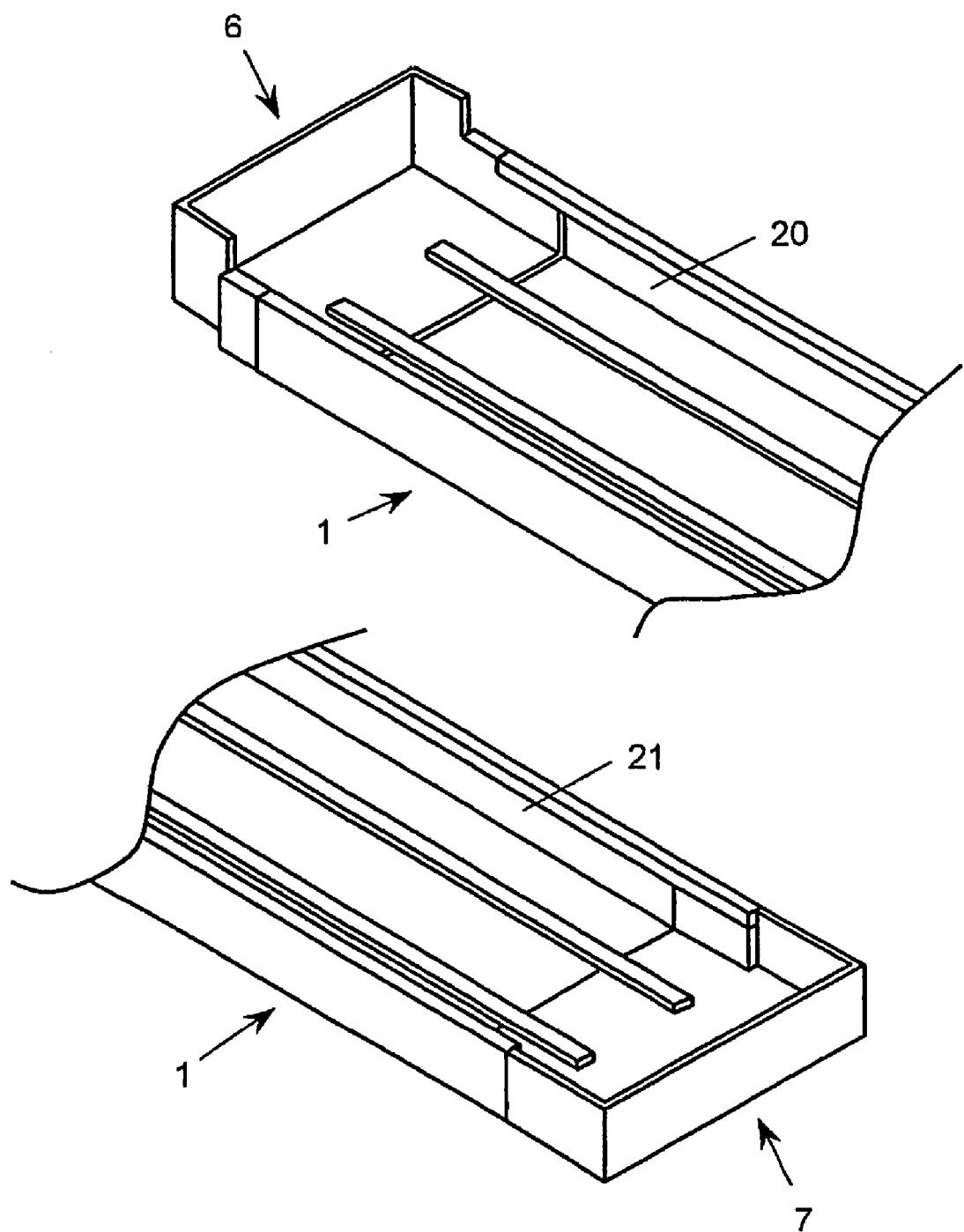
FIG. 4 shows two prefabricated side parts made of profiled strips including an inner and an outer corner joint.

FIG. 4 shows two end pieces 20 and 21 of profiled strips 1 which are provided with corner joints 6 and 7. Corner joints 6 and 7 are inserted into end pieces 20 and 21, respectively.

What is claimed is:

1. A cartridge filter comprising:
    a folded package including filter material;
    a frame holding the folded package, the frame including
        a plurality of elongated profiled strips, each having a U-shaped cross-section with a bottom and two side walls, and each having identical profiles and each having two ends, and a plurality of corner joints, each corner joint being disposed at one of the two ends of a respective profiled strip and each including an end cap for engaging pair wise with an end cap of an adjacent one of the plurality of corner pieces, each end cap having two lateral outer walls and a face wall between the two lateral outer walls, the two lateral walls aligned in a same direction with the side walls.

2. The cartridge filter as recited in claim 1, wherein the plurality of profiled strips are cut of a single extruded profiled section.

3. The cartridge filter as recited in claim 1, wherein the plurality of profiled strips include extruded plastic.

4. The cartridge filter as recited in claim 1, wherein the plurality of corner joints include at least one of injection molded parts and die cast parts.

5. The cartridge filter as recited in claim 1, wherein the side walls have an upper edge, each of the upper edges being bent inward.

6. The cartridge filter as recited in claim 5, wherein each profiled strip includes at least one guide strip disposed on the bottom.

7. The cartridge filter as recited in claim 6, wherein the at least one guide strip has a T-shaped cross section with a lower end of the T-shape connected to the bottom.

8. The cartridge filter as recited in claim 1, wherein the plurality of profiled strips includes two first strips opposing each other, and wherein the plurality of corner joints includes first identical corner joints disposed on each end of the first strips, the first identical corner joints being insertable into the first strips.

9. The cartridge filter as recited in claim 6, wherein each of the plurality of corner joints includes a U-shaped step that is insertable in an end of a profiled strip so as to form a positive fit.

10. The cartridge filter as recited in claim 9, wherein the U-shaped step includes a longitudinal slot configured to surround the guide strip.

11. The cartridge filter as recited in claim 1, wherein the lateral outer walls are aligned flush with the side walls of a respective profiled strip.

12. The cartridge filter as recited in claim 1, wherein filter material is configured to trap at least one of fine and suspended matter.

* * * * *